United States Patent [19]

Brisson et al.

[11] Patent Number: 5,394,393
[45] Date of Patent: Feb. 28, 1995

[54] METHOD FOR THE ROUTING OF A PACKET OF DATA IN A DIGITAL TRANSMISSION NETWORK

[75] Inventors: Jacques Brisson; Jean Caillemer, both of Paris; Thierry Grenot, Clamart, all of France

[73] Assignee: Thomson-CSF, Courbevoie, France

[21] Appl. No.: 931,708

[22] Filed: Aug. 18, 1992

[30] Foreign Application Priority Data

Sep. 6, 1991 [FR] France ................. 91 11051

[51] Int. Cl.[6] ............................................. H04J 3/24
[52] U.S. Cl. ....................................... 370/60; 370/94.2
[58] Field of Search ................. 370/94.1, 94.2, 60, 370/60.1, 94.3, 110.1, 58.1, 58.2, 58.3; 340/825.52

[56] References Cited

U.S. PATENT DOCUMENTS

| | | | |
|---|---|---|---|
| 4,218,756 | 8/1980 | Fraser . | |
| 5,062,106 | 10/1991 | Yamazaki et al. | 370/94.1 |
| 5,119,369 | 6/1992 | Tanabe et al. | 370/60 |
| 5,130,977 | 7/1992 | May et al. | 370/94.1 |

FOREIGN PATENT DOCUMENTS 0406842 1/1991 European Pat. Off. .

OTHER PUBLICATIONS

"The Concept of Virtual Paths & Virtual Channels in ATM-networks," H. Shneider, proceedings at 1990 International Zurich Seminar on Digital Communication, Electronic Circuits & Systems, New York, N.Y., 1990. pp. 63-72.

"Le Technique Temporelle Asynchrone", J. P. Coudreuse et al. Commutation & Transmission, Paris, 1990. vol. 12, No. 3, pp. 5-16.

"Broad-band ATM Network Architecture Based On Virtual Paths", K. I. Sato et al. IEEE Transaction on Communications. New York, 1990. vol. 38, No. 8, pp. 1212-1222.

Primary Examiner—Douglas W. Olms
Assistant Examiner—Chau T. Nguyen
Attorney, Agent, or Firm—Meltzer, Lippe, Goldstein

[57] ABSTRACT

A method for the routing of a packet of data in a digital transmission network where each packet is formed by a header, enabling this packet to be identified and guided, and a part containing information elements to be conveyed. This method consists, at each node of the network, of a first step for extracting, from the header, the address of a word of a memory containing the information elements needed to identify the header and to guide the data elements conveyed by the packet coming into the node and a second step for creating, according to the header of the incoming packet and the information elements contained in the word of the memory, a new address designating a memory zone containing at least one new header and the information on the outgoing direction of the packet or packets coming out of the node. The method can be applied to digital transmission networks where it is necessary to identify and route packets of data.

6 Claims, 6 Drawing Sheets

METHOD FOR THE ROUTING OF A PACKET OF DATA IN A DIGITAL TRANSMISSION NETWORK

BACKGROUND OF THE INVENTION

The present invention relates to a method for the routing of a packet of data in a digital transmission network. It can be applied notably to equipment for the shuffling arid switching of digital data comprising a network working in Asynchronous Transfer Mode (ATM). This mode of asynchronous transmission has been adopted by the CCITT (Consultative Committee International Telegraph and Telephone) for large-band integrated services digital networks more widely known by the abbreviation of LB-ISDN. More generally, the invention can be applied to all networks for the transmission of digital data elements where it is necessary to identify and route these data elements.

In a network working in ATM mode for example, the digitized information elements are exchanged among the nodes of the network in the form of packets of bits with a fixed format called "cells", a bit being a binary element taking a value of 0 or 1. A cell is formed by a header that can be used to identify the cell and notably the communication to which it belongs and an information field containing the useful data elements to be conveyed. The role of the shuffling and switching elements forming the nodes of the network is to route the cells arriving at their inlets towards one or more of their outlets. To this end, it is necessary notably to analyze the header of each incoming cell so as to deduce therefrom, firstly, the header that the cell will have when it goes out and, secondly, the outgoing direction or directions to be taken. The cells entering or going out of the nodes are conveyed by virtual paths. These paths are called virtual because they may in fact be supported by a same physical transmission line, an optical fiber or coaxial cable line for example. These paths are themselves subdivided into virtual channels. Each of the paths liable to enter or leave a node is referenced by identification numbers called VPI (virtual path identifier) for the paths and VCI (virtual channel identifier) for the channels. In general, the VPIs and VCIs may take a large number of values owing to the large number of paths and channels possible, typically several hundreds of thousands. This is especially so in networks working in ATM mode. It causes drawbacks, notably as regards memory capacities and their rates of use. Indeed, for a given node of the network, the management of all these paths, channels and associated identifiers calls for the use of random-access memories having very great memory capacities. Now, during operation, it is highly improbable that all the possible combinations of VPIs and VCIs would have to be used: this means that there is a very marked degree of under-utilization of the reserved memory.

SUMMARY OF THE INVENTION

The aim of the invention is to overcome the above-mentioned drawbacks. To this end, an object of the invention is a method for the routing of a packet of data in a digital transmission network using at least one memory, each packet, in transit through virtual channels that are themselves contained in virtual paths, being formed by a header containing at least the identification numbers of the virtual paths and of the virtual channels that it takes, and by a part containing information elements to be conveyed wherein, at each node of the network and foe each incoming packet, said method consists:

in a first step, in designating a word of a first part of the memory containing at least one word part defining the address of the second part of the memory, the address of the word containing at least the identification number of the path in which the packet of data entering the node is in transit;

in a second step, in designating at least one zone of the second part of the memory containing at least one new header and the outgoing direction for the packet or packets going out of the node, the address of the zone of the second part being the sum of the identification number of the channel taken by the packet coming into the node and of the word part defining the address of this second part.

The main advantages of the invention are that it can be used to reduce the size of the memory needed to identify and route the cells entering the nodes of the network through virtual paths and virtual channels identified by their above-mentioned identifiers while at the same time keeping all the possible transmission paths and channels, that it can be adapted to different modes of transmission and, finally, that it is simple to implement.

BRIEF DESCRIPTION OF THE DRAWINGS

Other features and advantages of the invention shall appear from the following description, made with reference to the appended drawings, of which.

DESCRIPTION OF THE INVENTION

Figure 1A:
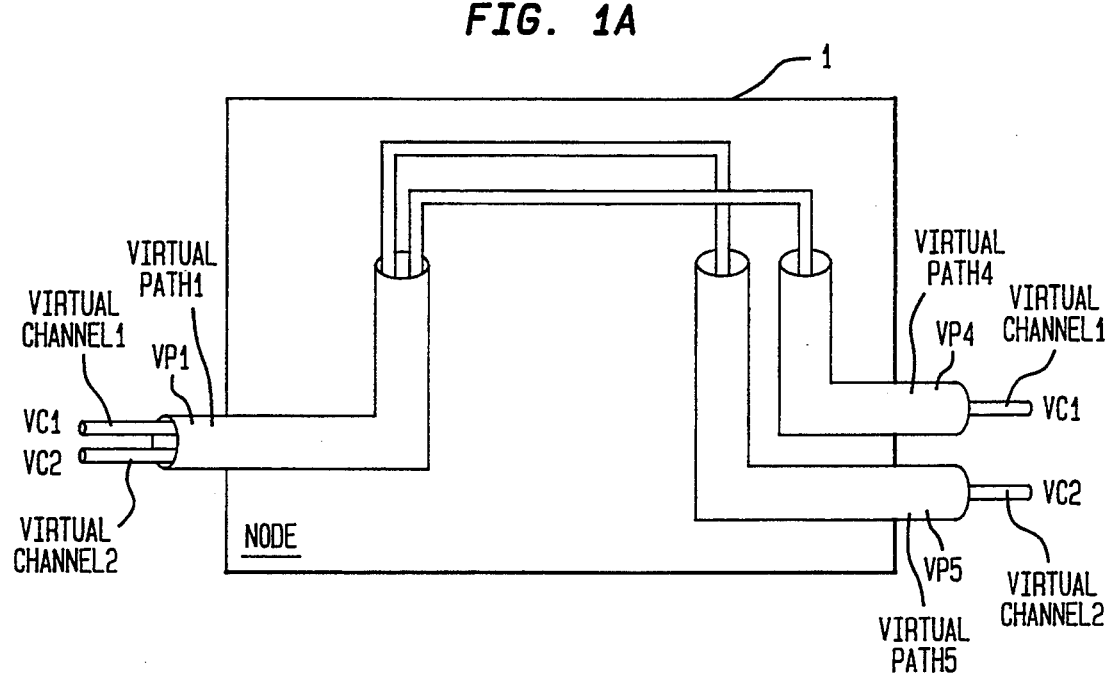
FIG. 1a shows a principle of switching of the virtual channels.
Figure 1B:
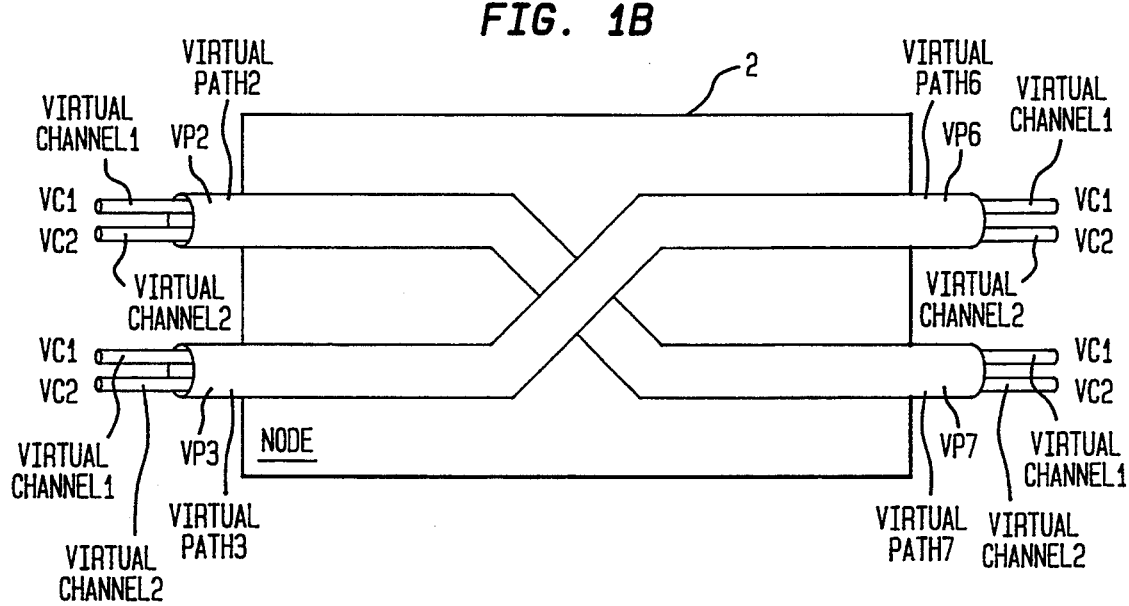
FIG. 1b shows a principle of switching of the virtual paths.

FIG. 1a shows a principle for the switching of virtual channels. Only one path VP1 entering the node 1 of a network is shown. The incoming path VP1 contains two channels VC1 and VC2. The interpretation of the headers of the cells travelling in transit through these channels is such that, to this incoming channel VP1, there corresponds, at the outlet of the node 1, two paths VP4 and VP5, each containing a channel VC1. The switch places VP1-VC1 in correspondence with VP5-VC2 and VP1-VC2 in correspondence with VP4-VC1. FIG. 1b shows a principle of switching of virtual paths.

To the path VP2 entering the node 2 of a network, there corresponds the outgoing path VP7 and to the incoming path VP3 there corresponds the outgoing path VP7. In this case, there has been no switching of channels, since the channels VC1 and VC2 present in the incoming paths VP2 and VP3 are again contained in the outgoing paths VP6 and VP7.

Figure 2:
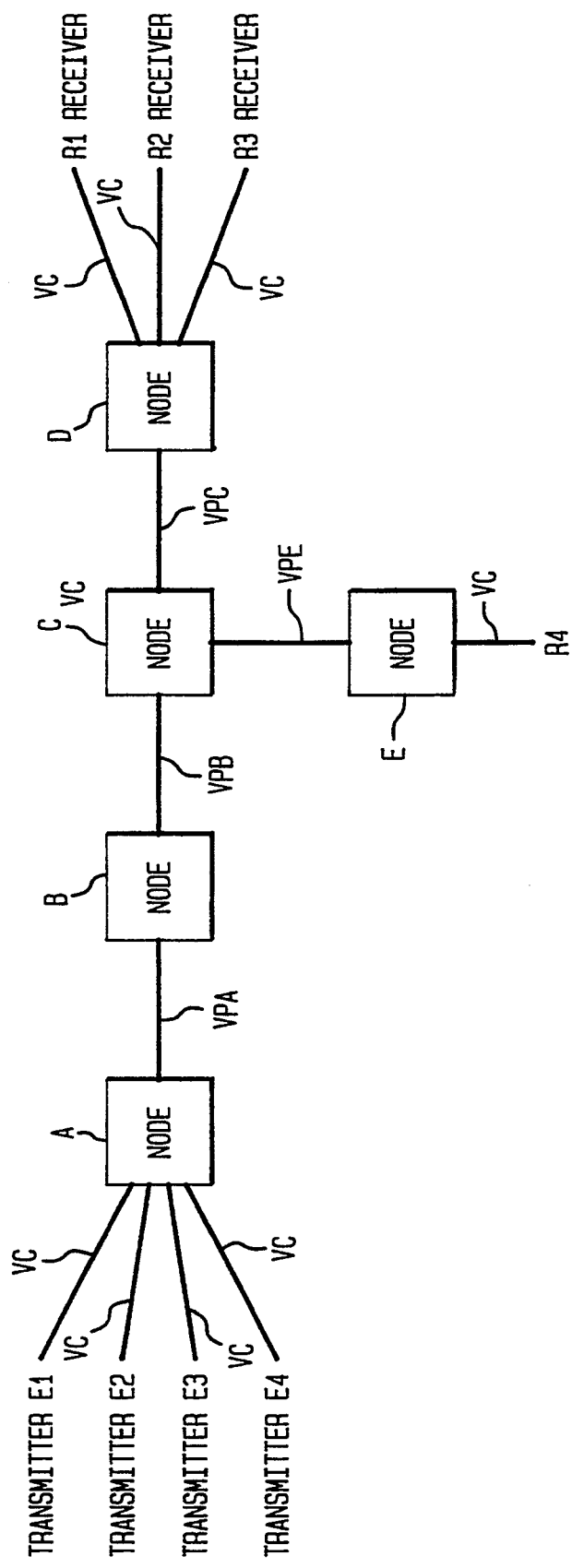
FIG. 2 shows a typical exemplary application of switching operations.

FIG. 2 shows a typical example of an application of these switchings. The transmitters E1, E2, E3 and E4 are respectively communicating with the receivers R1, R2, R3 and R4. At the node A, there is a switching of the channels VC coming from the transmitters E1, E2, E3, E4 as indicated in the example of FIG. 1a to give the outgoing path VPA. At the node B, there are the path switchings as indicated in the case of FIG. 1b. At the node C, the virtual channels are switched so as to place the channel conveying the information from E4 in the virtual path VPE and the other three in the virtual path VPC. Finally, at the nodes D and E, to the incoming paths VPC and VPE, there correspond, at the outlets, the four channels VC directed towards the receivers R1, R2, R3 and R4. Between the nodes A and C, the paths VPA, VPB preserve the channels VC which undergo no switching at all.

Figure 3A:
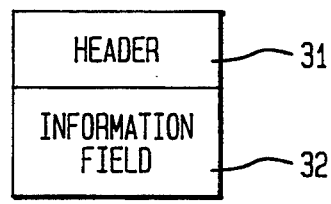
FIG. 3a shows an exemplary cell format.
Figure 3B:
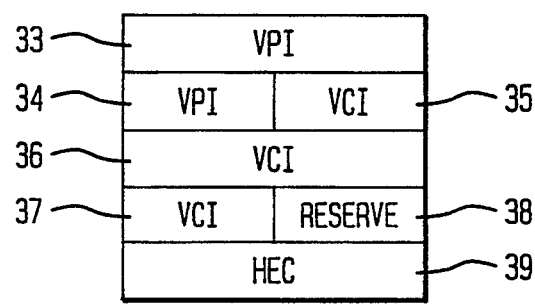
FIG. 3b shows an exemplary constitution of a header cell.

FIG. 3a shows the format of a cell used in the ATM transmission mode. A cell is constituted by a header 31 encoded on five bytes, a byte being a word formed by eight bits, and an information field 32 encoded on 48 bytes. The information field contains the useful data elements to be conveyed. FIG. 3b develops the constitution of the header 31 of a cell. A byte and a half, 33, 34, i.e. 12 bits, are reserved for the encoding of the VPI identifier of the path to which the cell belongs. Two bytes, 35, 36, 37, namely 16 bits, are then reserved for the encoding of the VCI identifier of the channel to which the cell belongs. There are four reserve bits 38, the use of which is not defined herein. Finally a byte 39 is reserved to generate a transmission error control code known as the Header Error Control (HEC) code. This byte 39 does not play a role in the significance of the header.

Figure 4:
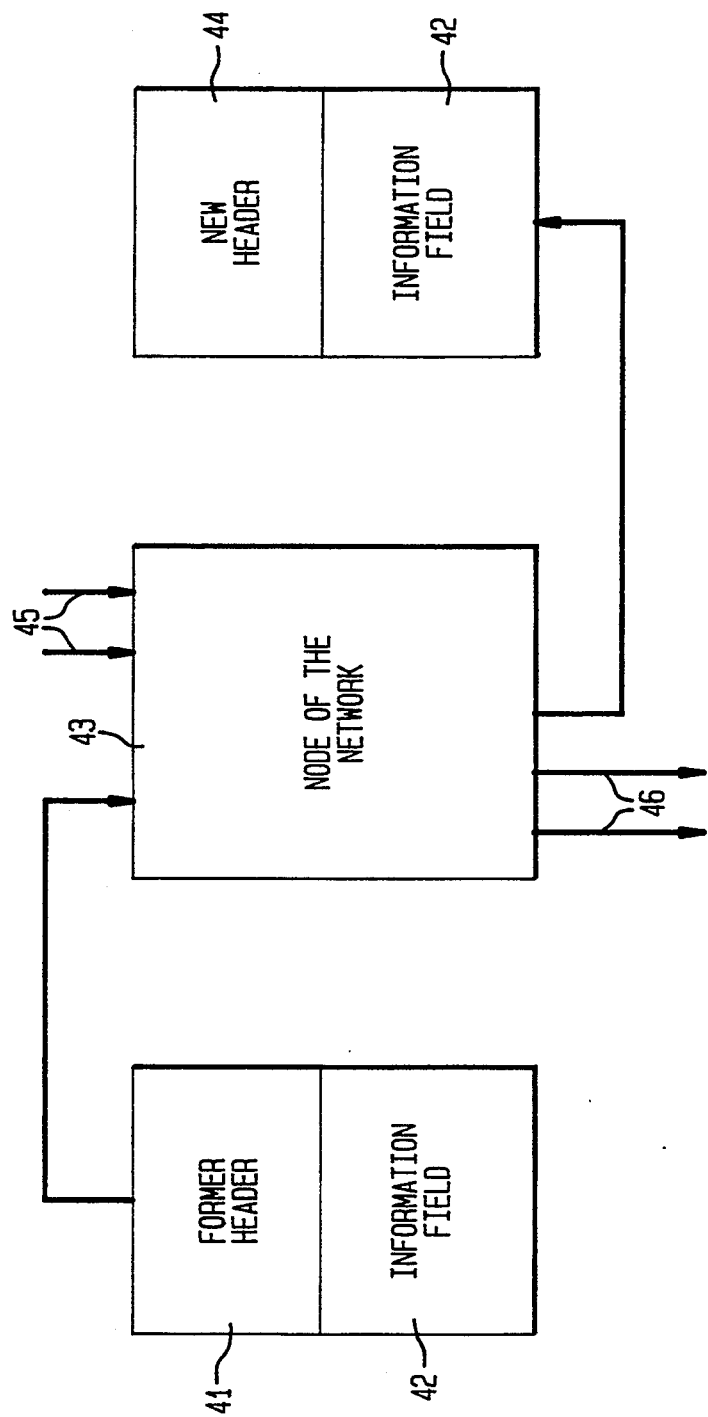
FIG. 4 shows the passage of a cell through the node of a transmission network.

To enable the routing of the cells through the transmission network, the invention proposes a method for the implementation, in a hardware system and at each node of the network, of a function for the translation of the header which, for each cell, gives a new header and an outgoing direction as a function of the former header of the incoming corresponding cell and its incoming direction as shown in FIG. 4.

The useful data elements are contained in the information field 42. They are preceded by the former header 41, containing the incoming VPIs and VCIs. Besides, the information on the direction of the cell entering the node 43 of the network is available. Depending on the former header 41, the translation function according to the invention associates, with the information field 42 in transit through the node 43, a new header 44 going out of this node 43, as well as an information element designating the outgoing direction. In this FIG. 4, the arrows 45 symbolize other incoming directions into the node of the network and the arrows 46 indicate other outgoing directions from this node. Theoretically, since the VPI and VCI identification numbers are encoded on 12 and 16 bits, to which there are added four reserve bits, the addressing space for the working memory 53 should be equal to 32 bits. Now, this represents a size of memory that greatly exceeds capacities for the manufacture fast memories, both now and in the near future.

Figure 6A:
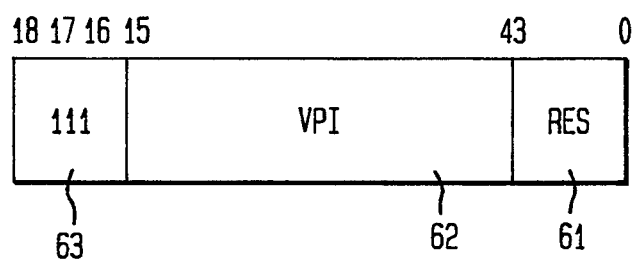
FIG. 6a shows a possible structure of the address of a memory word enabling the computation of the address of the new header and of the direction of a cell going out of a node of the network.
Figure 6B:
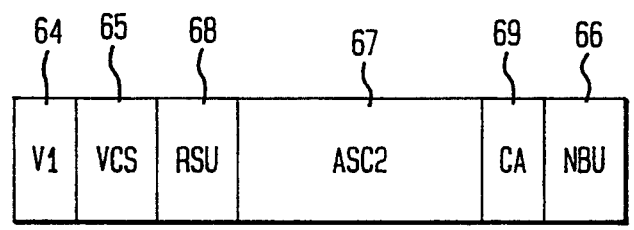
FIG. 6b shows a possible structure of the above-mentioned memory word.
Figure 5:
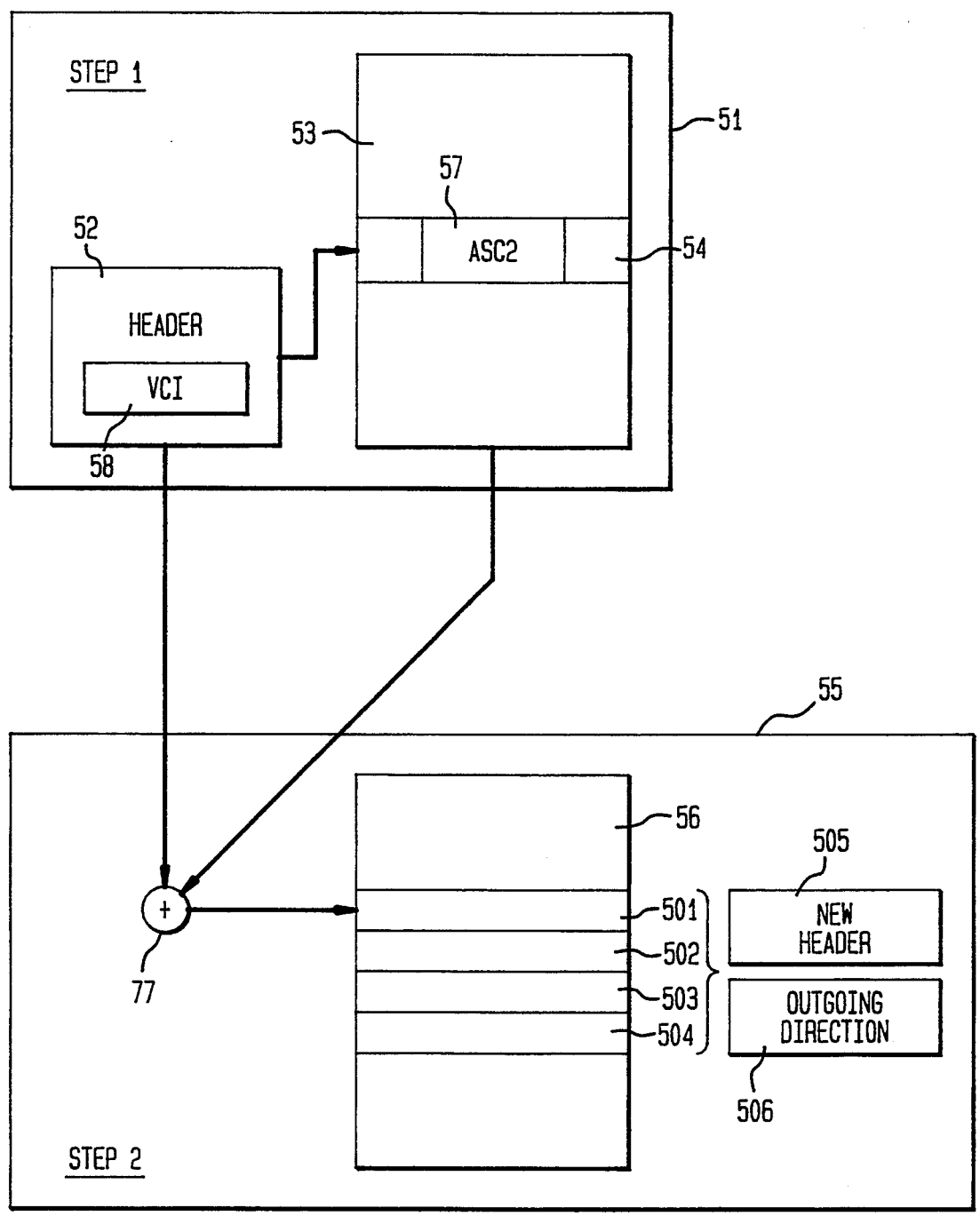
FIG. 5 illustrates steps of the method according to the invention.

To avoid this drawback, the method according the invention comprises two steps as can be seen FIG. 5. According to a first step 51, an address extracted from the header 52 of the cell. The address extracted from the header 52 makes it possible to designate a word 54 of the working memory 53. The data element encoded on the word 54 represents the new header and the outgoing direction. The address extracted from the header 52 is structured according to FIG. 6a. This address is encoded, for example, on 19 bits. The bits 0 to 3 (61) contain the reserve bits 38 of the header, and the bits 4 to 15 contain the code of the VPI identifier of the incoming path present in the header as shown in FIG. 3b. Finally, the three most significant bits 16 to 18 are, for example, positioned at 1. This encoding of the address extracted from header can be done differently. In particular, reserve bits 61 and the bits positioned at 1 (63) not absolutely necessary. Besides, other encoding bits could be added, but this would lead to an increase in the size of the memory. Hence, with each combination of bits of the incoming header, except for the bits coding the VCI and the HEC, there is associated a word of the memory called a context 1. This word is designated by the address shown in FIG. 6a, and it is represented by FIG. 6b. This word may be encoded, for example, on 32 bits. This word contains at least one validation V1 bit 64, one bit VCS 65 indicating whether the switching is a path switching or a channel switching, four NBU bits 66 defining the number of useful bits to encode the VCI identifier of the channel contained in the incoming path and 16 bits 67, referenced ASC2 for example, defining the address of the memory zone where the channels of the incoming path have their translation context. This context is referenced context 2. This word may furthermore contain one or more reserve bits RSV 68 and bits CA 69 used for example to carry out a count of anomalies. The structure of the address of FIG. 6a and the structure of the word designated by this address arise out of the fact that, at a given instant, it is improbable that all the combinations between the VPI and VCI identifiers will have to be used, i.e. it is possible, for each path, to define the number of channels that are used. This number of channels used enables a definition of the number of bits encoding their corresponding VCI identifiers, this being achieved through the fact, specified in the ATM transmission standard for example, that the zone of the assigned VCI identifiers always starts at 0. This number of useful bits encoding the VCIs is indicated by the NBU 66. Since the VCIs are, for example, encoded at most on 16 bits, the NBU encoded on 4 bits makes it possible to determine the number of bits used between 1 and 16. For example, if it is planned that the number of channels used will be at most equal to 255, the number of bits used will be equal to 8, and this number 8 will be memorized by the NBU 66. According to FIG. 5, after the first step 51 in which the memory word 54 or context 1 has been designated, in the second step 55, if the context 1 is validated by the bit V1, the context 2 is addressed, this context 2 being in fact the translation context which gives the new header 505 and the outgoing direction 506. The address which designates the information elements giving the new header and the outgoing direction contained, for example, by the words 501, 502, 503 and 504 of the memory 56 of successive addresses, is constituted through the addition 77 of the bits ASC2 57 of the word 54 and the useful bits 58 for the encoding of the VCIs. The bits ASC2 have been defined further above in FIG. 6b.

Figure 7A:
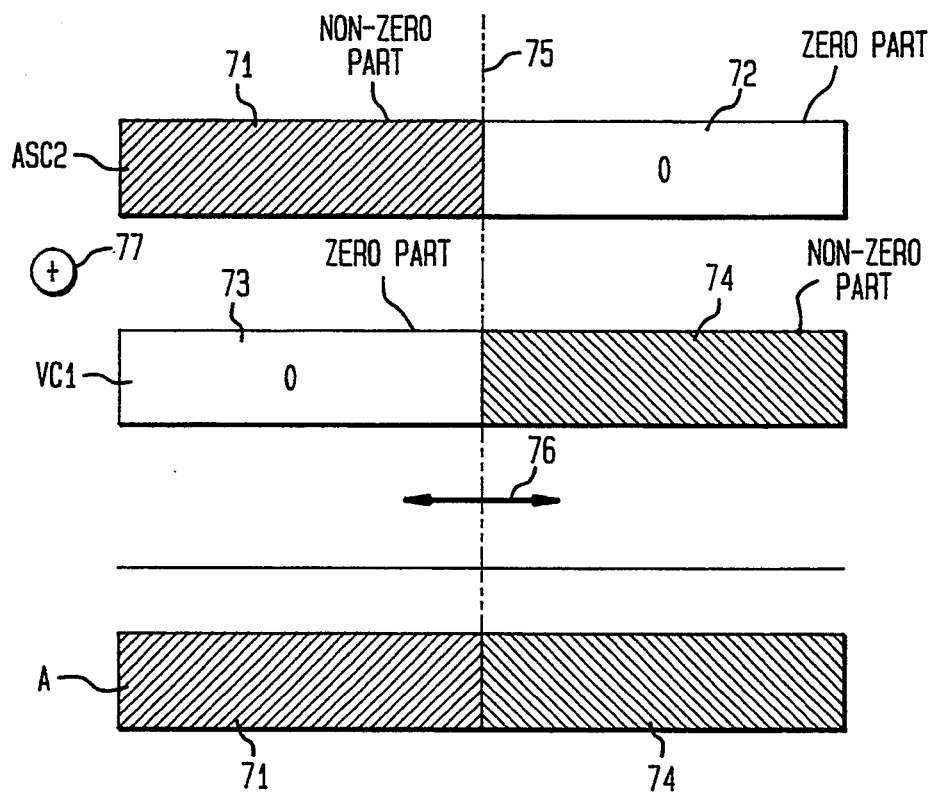
FIG. 7a shows a possible mode of computation of the address of a memory zone containing the new header and the direction of a cell going out of a node of the network.
Figure 7B:
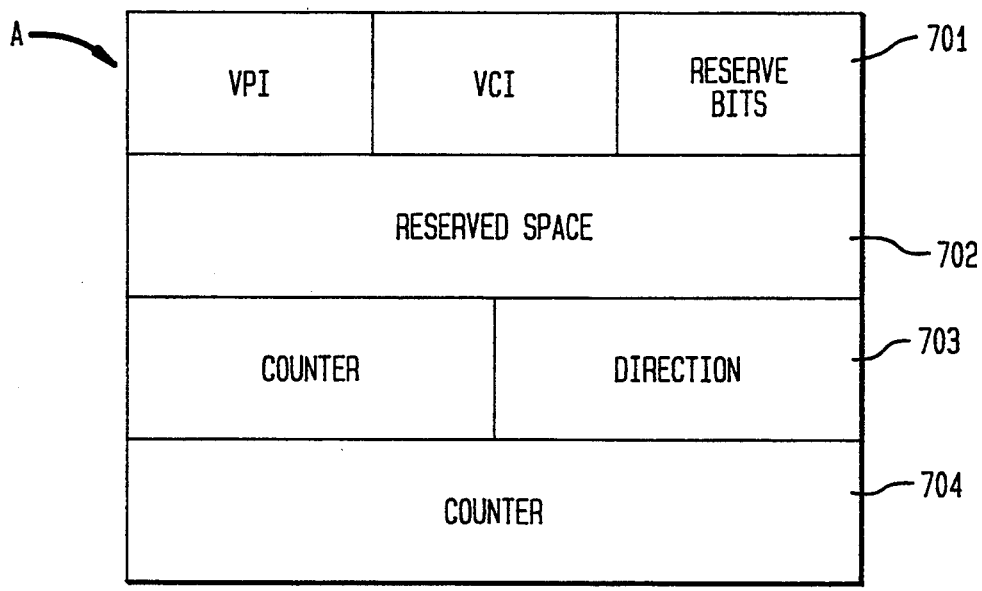
FIG. 7b shows a possible structure of the above-mentioned memory word.

FIG. 7a shows how the address of the word 501 of the context 2 is computed according to the invention. The bits ASC2 coming from the word 54 of the context 1 memory is formed by a non-zero part 71 and a part 72 where all the bits are positioned at zero. This number of bits positioned at zero corresponds to the number of useful bits for the encoding of the VCI. This number is indicated by the value of the NBU encoded on the word 54 of the context 1 memory. The word encoding the VCI is added to the bits ASC2. This word is constituted by a zero part 73 and a non-zero part 74 encoded on the number of useful bits indicated by the NBU. The line of dashes 75 indicates that the parts 71 and 73, on the one hand, and 72 and 74 on the other, have an equal number of bits. Indeed, the word ASC2 has a number of least significant bits positioned at 0. This number of least significant bits is equal to the number of useful bits encoding the VCI identification number. The arrow 76 recalls that these numbers of bits may vary and depend on the number of useful bits encoding the VCI, i.e. depend in fact on the number of channel contained in the incoming path. The addition of the ASC2 and VCI words 77, illustrated by the "+" sign, composite address A of the parts 71 and 74.

This address A can be used to designate the words of the context 2 which define the new header as well as the outgoing direction from the cell. The cell 7b gives an exemplary definition of these words of the context 2 identified in FIG. 5 by the numbers 501, 502, 503 and 504. The word 701 designated by the address A contains the new header of the outgoing cell except for the HEC error code. The word 701 indeed contains the VPI VCI identifiers corresponding to the path and to the channel taken by the cell coming out of the node, and also contains reserve bits. The following word 702 may, for example, constitute a reserve space. The following word 703 may contain, for example, a counter as well as the information on outgoing direction. Finally, the following word 704 may also contain, for example, another counter. This definition of the words of the context 2 is given by way of an example. What is important is that the new header as well as the information on direction should be present. Following the description of the method, it can be seen that the transit memory is divided into two zones, one zone corresponding to the context 1 words and one zone corresponding to the context 2 words. The data elements of this memory may be encoded, for example, on 32 bits. The addressing space of the context 1 zone should be at least equal to the number of bits for the encoding of the VPIs as shown in FIG. 6a, i.e. 12 bits. If necessary, by adding reserve bits and pre-positioned bits, this number may reach 19 as is the case, for example, in FIG. 6a.

With respect to the context 2 zone, the number of bits N constituting the addressing space should at least be strictly greater than the number of VCI encoding bits to have at least one different translation context 2 per context 1. In the example explained herein, the number of the VCI encoding bits is equal to 16. The number N can be chosen so as to obtain the most efficient compromise between the cost of the translation function according to the invention and the number of active channels at a given time. In fact, the total number of translation contexts is constant and determined but, according to the invention, it is distributed with the optimum efficiency among the different paths at a given instant. Thus, all the combinations of the elements of the incoming header are possible, but not all of them at the same time: this causes no disturbance in practice.

What is claimed is:

1. A method for the routing of a packet of data in a digital transmission network comprising a plurality of nodes which each have a memory, said packet, in transit through virtual channels that are themselves contained in virtual paths, being formed by a header containing at least the identification numbers of the virtual paths and of the virtual channels that it takes, and by a part containing information elements to be conveyed wherein, at one of said nodes of the network and for said packet coming into said one node, said method comprises,
    in a first step, in designating a word of a first part of said memory containing at least one portion of an address of a second part of said memory, wherein an address of said designated word contains at least an identification number of a path in which said packet of data entering said one node is in transit;
    in a second step, in designating at least one zone of said second part of said memory containing at least one new header and information indicating a direction taken by said packet going out of said one node, wherein an address of said designated zone of said second part is a sum of an identification number of a channel taken by said packet coming into said one node and of said at least one portion of said address of said second part of said memory; and
    switching said packet from said one node to a second node of said network depending on said information indicating a direction contained in said designated zone of said second part of said memory.

2. A method according to claim 1, wherein the word of the first memory part contains at least one information element defining a number of useful bits to encode the identification number of a channel taken by said packet coming into said one node of the network.

3. A method according to claim 1, wherein the word of the first memory part contains a validation bit.

4. A method according to claim 1, wherein the word of the first memory part contains a bit indicating whether it is a path switching or a channel switching that takes place at said one node.

5. A method according to claim 1, wherein the word of the first memory part contains bits carrying out a count of anomalies.

6. A method according to claim 1, wherein said at least one portion of said address of said second part of said memory comprises a sequence of least significant bits having a value of 0, wherein the number of said bits of said sequence is greater than or equal to the number of useful bits encoding the identification number of the channel of said packet coming into said one node, the useful bits of the identification number being encoded from a value greater than or equal to 0.

* * * * *